J. F. ORR.
Cotton Gin.

No. 19,041. Patented Jan. 5, 1858.

UNITED STATES PATENT OFFICE.

JAS. F. ORR, OF ORRVILLE, ALABAMA.

IMPROVEMENT IN COTTON-GINS.

Specification forming part of Letters Patent No. 19,041, dated January 5, 1858.

To all whom it may concern:

Be it known that I, J. F. ORR, of Orrville, in the county of Dallas and State of Alabama, have invented a new and useful Improvement in Cotton-Gins; and I do hereby declare that the following is a full, clear, and exact description of the construction and operation of the same, reference being had to the annexed drawings, forming part of this specification, in which—

Figure 1:
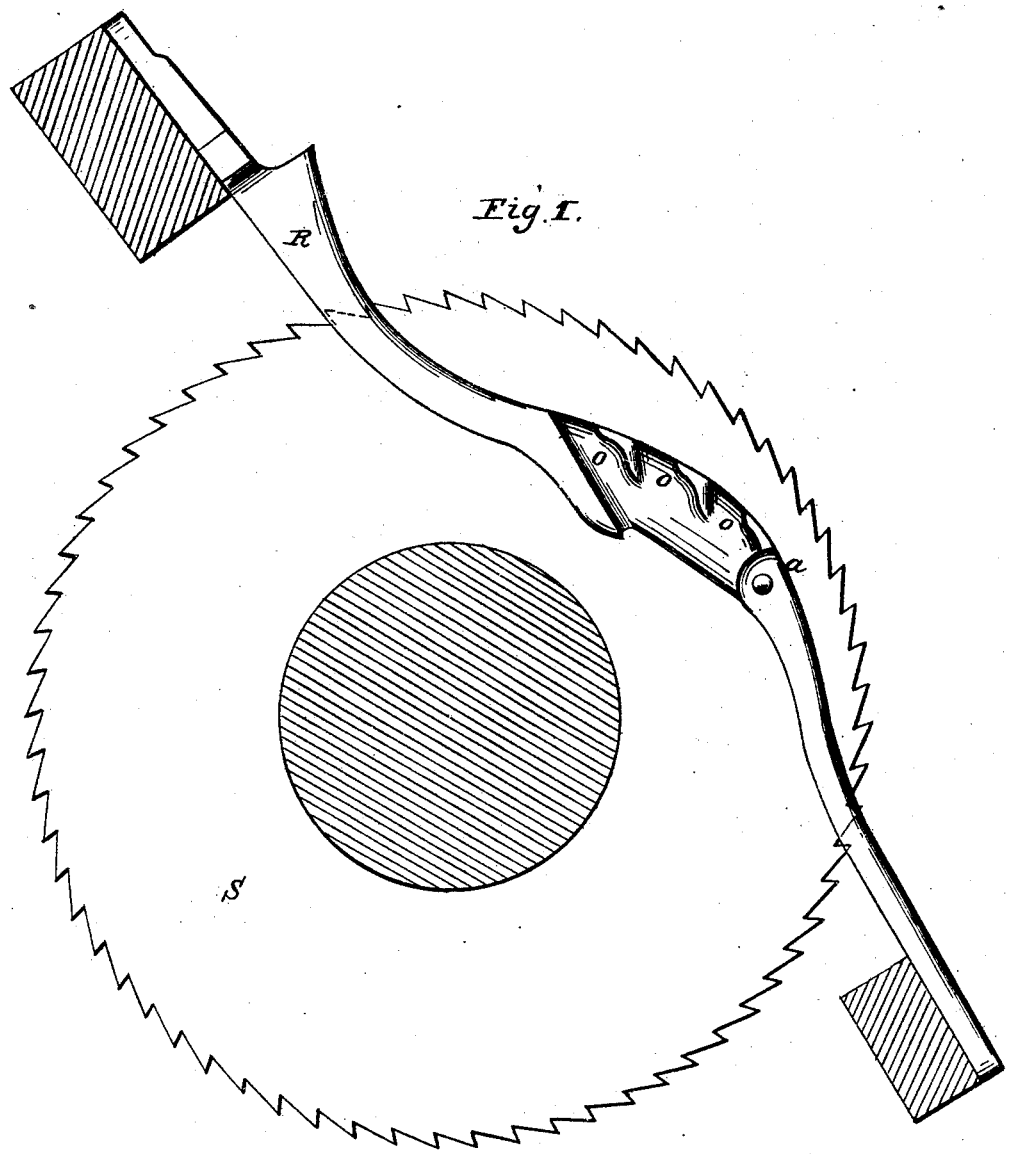
Figure 2:
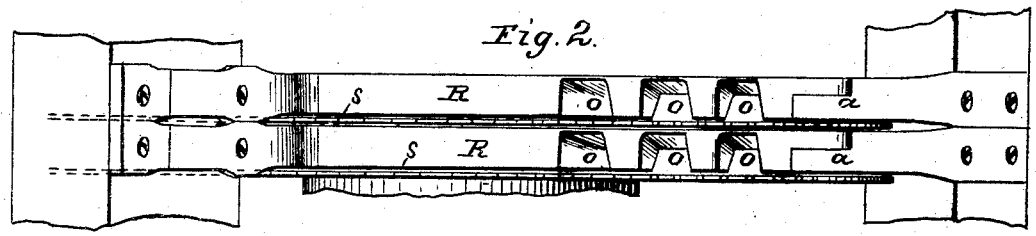

Figure 1 is a side view of rib, showing its position relative to the saw. Fig. 2 is a top view of the same.

Similar characters of reference in the several figures denote the same part.

The nature of my invention consists in constructing the ribs of cotton-gins with one or more openings for the passage of seed and dirt, as will be hereinafter set forth.

In the drawings, R is the rib, jointed, as shown at a, or made rigid, if desired. O O O are openings through the rib to carry off the seed and dirt. There may be any desired number of these openings. S represents the saw, and shows its position relative to the rib and openings.

The advantages of this construction consists in quickly carrying off the separated seed, whereby the operation is greatly facilitated.

What I claim as my invention, and desire to secure by Letters Patent, is—

Making in the ribs or grates of cotton-gins, either jointed or rigid, one or more openings for the passage of seed and dirt, substantially as set forth.

In testimony whereof I have hereunto signed my name before two subscribing witnesses.

J. F. ORR.

Witnesses:
F. H. SMITH,
F. T. TALBERT.